United States Patent
Butler et al.

(10) Patent No.: US 10,141,854 B1
(45) Date of Patent: Nov. 27, 2018

(54) ISOLATED POWER SUPPLY SYSTEM AND METHOD FOR AN UNDERSEA COMMUNICATION CABLE

(71) Applicant: Diversified Technologies, Inc., Bedford, MA (US)

(72) Inventors: Neal R. Butler, Acton, MA (US); Noah H. Silverman, Cambridge, MA (US); Kevin Vaughan, Bedford, MA (US)

(73) Assignee: Diversified Technologies, Inc., Bedford, MA (US)

( * ) Notice: Subject to any disclaimer, the term of this patent is extended or adjusted under 35 U.S.C. 154(b) by 0 days.

(21) Appl. No.: 15/689,521

(22) Filed: Aug. 29, 2017

(51) Int. Cl.
*H02M 3/335* (2006.01)
*H02M 1/088* (2006.01)
*H04B 3/54* (2006.01)
*H02M 1/32* (2007.01)
*H02M 1/00* (2006.01)

(52) U.S. Cl.
CPC ....... *H02M 3/33569* (2013.01); *H02M 1/088* (2013.01); *H02M 1/32* (2013.01); *H04B 3/54* (2013.01); *H02M 2001/008* (2013.01)

(58) Field of Classification Search
CPC .... H02M 3/33569; H02M 1/088; H02M 1/32; H02M 2001/008; H04B 3/54
See application file for complete search history.

(56) References Cited

U.S. PATENT DOCUMENTS 6,611,443 B2    8/2003   Gaudreau
2004/0130215 A1*   7/2004   Muramatsu ......... B60L 11/1811
                                                                  307/69

FOREIGN PATENT DOCUMENTS

JP         2002153061 A   *   5/2002

* cited by examiner

*Primary Examiner* — Jue Zhang
(74) *Attorney, Agent, or Firm* — Iandiorio Teska & Coleman, LLP (57) ABSTRACT

An isolated power supply system for an undersea communication cable includes one or more power converters each including input circuitry responsive to an input current from a communication cable power conductor and in series with the communication cable power conductor of the undersea communication cable. One or more outputs are electrically isolated from the communication cable power conductor. A controller is coupled to each of the one or more power converters. The controller is configured to control the operation of the one or more power converters to provide the one or more outputs coupled to an external load located on a branch off of the undersea communication cable.

42 Claims, 9 Drawing Sheets

Providing one more power converters each including input circuitry responsive to input current from an undersea communication cable power conductor.
500

Providing one or more outputs electrically isolated from the communication power conductor.
502

Controlling the operation of the one or more power converters to output the one or more outputs coupled to an external load located off a branch of the undersea communication cable.
504

*FIG. 10*

ISOLATED POWER SUPPLY SYSTEM AND METHOD FOR AN UNDERSEA COMMUNICATION CABLE

FIELD OF THE INVENTION

The subject invention relates to an isolated power supply system and method for an undersea communication cable.

BACKGROUND OF THE INVENTION

Intercontinental undersea communication cables may be used to transmit high speed digital signals over low loss fiber optics. Repeaters are needed at various intervals to amplify and restore attenuated light signals. The repeaters are electronic devices which require power. The repeaters are typically a plurality of light emitting diodes (LEDs) which are used to excite laser amplifiers embedded in the individual optical fibers. More complex repeaters, which receive the light pulses, convert the light pulses to electrical signals and retransmit optical pulses, may also be needed due to the accumulated dispersion of the very long undersea communication cables.

To deliver power to the repeaters, high voltage, low current DC power sources e.g., ±15 kV, 1 A, are placed at each end of the undersea communication cable. This power is carried to all the repeaters by a single communication power conductor. The repeaters are connected in series such that source current flows through the repeaters. The voltage to sea ground varies significantly along the cable, from a very high positive voltage at the positive end, falling at each repeater, turning negative, and falling to a maximum negative voltage at the negative end. The repeaters are electrically isolated from sea ground and are powered by current flowing from one end of the cable to the other without regard to the voltage to sea ground.

There is often a need to create a branch from the undersea communication cable so communication between more than two points may obtained without requiring completely separate cables. Powering the repeaters in a branch can be problematic since the main power conductor cannot be branched and the relative voltage to sea water at any particular point is unknown variable or not at all defined. In addition, it may be desired to supply power to nearby external load which may have an arbitrary and dynamically changing resistance or power, such as undersea devices, equipment, and the like, not related to the typical main function of the undersea communication cable.

SUMMARY OF INVENTION

In one aspect, an isolated power supply system for an undersea communication cable is featured. The system includes one or more power converters each including input circuitry responsive to an input current from a communication cable power conductor and in series with the communication cable power conductor of the undersea communication cable. One or more outputs are electrically isolated from the communication cable power conductor. A controller is coupled to each of the one or more power converters. The controller is configured to control the operation of the one or more power converters to provide the one or more outputs coupled to an external load located on a branch off of the undersea communication cable.

In one embodiment, the one or more outputs may include one or more of: an output voltage, a programmable output voltage, a regulated DC output voltage, an output current, a programmable output current, and a desired regulated DC current. The input circuitry of each of the one or more power converters may include a plurality of sections configured to divide the input voltage from the communication cable power conductor between the sections. The controller may be coupled to the input circuitry of each of the one or more power converters by magnetic isolation. The controller may be configured to control the operation of the input circuitry of each of the one or more power converters by pulse width modulation. The one or more outputs may be electrically isolated from the communication cable power conductor by an isolation transformer. The input circuitry for each of the one or more converters may include a modulated converter followed by an inverter. The inverter may be configured to drive a transformer primary circuit including an isolation transformer, the transformer core, and a capacitor to allow switches of the inverter to open at low currents. The inverter may include a square wave inverter. The transformer core may be gapped to allow switches of the inverter to close at zero voltage. The input circuitry of each of the one or more power converters may include a bypass capacitor. The modulator converter may include one or more controllable switches and the inverter includes one or more controllable switches. The controller may be coupled to the one or more controllable switches of the inverter, an arbitrary and dynamically changing external load impedance located on the branch of the undersea communication cable, the controller configured to measure the input current communication cable power conductor, a regulated DC voltage output by the modulated converter, a desired regulated DC output voltage, a desired regulated DC current, and an external load impedance and configured to determine and adjust the duty cycle of switching of the controllable switches of the modulated converter and the inverter such that the desired regulated DC output voltage and/or the desired regulated DC current is provided to the external load impedance. The switching of the controllable switches by the controller may include pulse width modulation. The controllable switches of the modulated converter and the inverter may include one or more of: field effect transistors, silicon carbide metal oxide, field effect transistors (MOSFETs), insulated gate bi-polar transistors (IGBTs), field effect transistor controlled Thyristors (MCTs), gate runoff Thyristors (GTO), and power Darlingtons. The system may include a voltage regulator coupled to the one or more power converters and the controller configured to provide power to the one or more power converters and the controller. The one or more power converters may include a plurality of power converters. The branching unit may be housed in a pressure vessel. The input circuitry and each of the one or more power converters may include an isolated variable DC-DC transformer circuit. The controller may be configured to control the operation of the variable DC-DC transformer circuit to provide current limiting. The controller may be configured to control the operation of the variable DC-DC transformer circuit to provide the output current. The controller may be configured to control the operation of the variable DC-DC transformer circuit to provide voltage limiting. The controller may be configured to control the operation of the variable DC-DC transformer circuit to provide the output voltage. The isolated DC-DC transformer circuit may include a programmable voltage regulator. The controller may be configured to control the operation of the isolated DC-DC transformer circuit to provide power to the branch off the undersea communication cable. The controller may be configured to control the operation of the isolated DC-DC transformer circuit to provide power to a load off the undersea communication cable. The system may include a fault protection circuit coupled to the communication cable power conductor and the isolated DC-DC transformer circuit configured to bypass fault current around the input circuitry of one or more power converters. The system may include an output voltage clamp coupled to the isolated DC-DC transformer circuit and the communication cable power conductor configured to limit the output voltage to a maximum desired output voltage. The output voltage clamp may include a controllable switch and a diode. The maximum desired output voltage may be about 10 V when the controller is not energized. The input circuitry may include a current divider coupled between the communication cable power conductor and the isolated DC-DC transformer circuit configured to direct a fraction of the input current to the isolated DC-DC transformer circuit. The current divider may be configured as a boost regulator including one or more of a diode, an inductor, a controllable switch, and an isolated gate driver circuit. The controller may be configured to control the input circuitry and the one or more outputs by pulse width modulation. The controller may be configured to provide a large DC ripple current for toning.

In another aspect, a method for providing isolated power from a current carrying undersea communication cable to a branch located off the undersea communication cable is featured. The method includes providing one or more power converters each including input circuitry responsive to input current from an undersea communication cable power conductor, providing one or more outputs electrically isolated from the communication power conductor, and controlling the operation of the one or more power converters to output the one or more outputs coupled to an external load located off a branch of the undersea communication cable.

In another embodiment, the controlling may include controlling the operation of the variable DC-DC transformer circuit to provide current limiting. The controlling may include controlling the operation of the variable DC-DC transformer circuit to provide the output current. The controlling may include controlling the operation of the variable DC-DC transformer circuit to provide voltage limiting. The controlling may include controlling the operation of the variable DC-DC transformer circuit to provide the output voltage. The controlling may include controlling the operation of the isolated DC-DC transformer circuit to provide power to the branch off the undersea communication cable. The controlling may include controlling the operation of the isolated DC-DC transformer circuit to provide power to a load off the undersea communication cable. The method may include providing a fault protection circuit coupled to the communication cable power conductor and the isolated DC-DC transformer circuit configured to bypass fault current around the input circuitry of one or more power converters. The method may include providing an output voltage clamp coupled to the isolated DC-DC transformer circuit and the communication cable power conductor configured to limit the output voltage to a maximum desired output voltage. The input circuitry may include a current divider coupled between the communication cable power conductor and the isolated DC-DC transformer circuit configured to direct a fraction of the input current to the isolated DC-DC transformer circuit. The controlling may include controlling the input circuitry and the one or more outputs by pulse width modulation.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figures 1, 2:
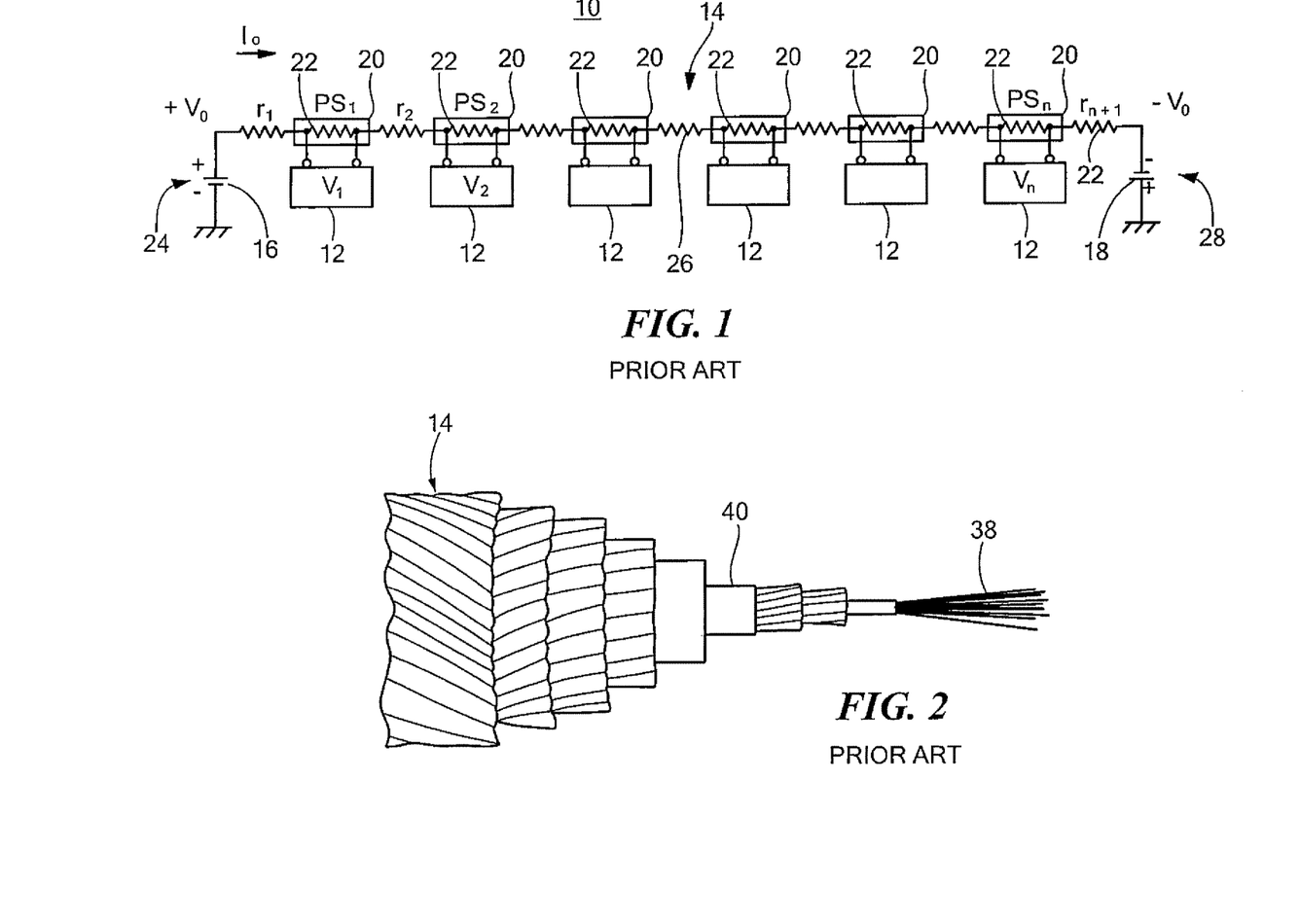
FIG. 1 is a schematic block diagram showing one example of a conventional system to deliver power to repeaters located on an intercontinental undersea communication cable.
FIG. 2 is a schematic block diagram showing in further detail one example of the undersea communication cable shown in FIG. 1.

As discussed in the Background section above, conventional system 10, FIG. 1, provides power to remotely located repeater stations 12 located at intervals along undersea communication cable 14, typically in inaccessible locations undersea. Power may be supplied to repeaters 12 by establishing a current flow through high voltage undersea communication cable 14 by connecting high voltage, low current DC power supply 16, e.g., ±15 kV, 1 A, of one polarity at one end of undersea communication cable 14 and high voltage power supply 18 of opposite polarity at the other end of undersea communication cable 14 as shown. The individual, low-voltage, low current power supplies 20 for remotely located repeater stations 12 are typically spliced into undersea communication cable 14 at the various repeater stations a shown. The necessary operating voltage at each remotely located repeater station 12 is developed by the voltage drops obtained across equivalent input resistances 22 of each successive power supply 12. The total power to be supplied to the system includes of the sum of the wattages developed at each power supply 20 and in each segment of cable resistance. The voltage level across high voltage undersea communication cable 14 varies significantly to sea ground, from a very high positive voltage at end 24, falls steadily to middle 26, turns negative and continues to fall to a maximum negative voltage at end 28. Such a design stresses the cable insulation at its extremities and makes very difficult or virtually impossible at most locations to breach the cable or have it sustain damage without risk of a ground fault. See, e.g., U.S. Pat. No. 6,611,443, by one or more of the inventors hereof and the Assignee hereof, incorporated by reference herein.

Intercontinental undersea communication cable 14 may be utilized to transmit high speed digital signals over low loss fiber optic fibers enclosed in undersea communication cable 14, e.g., fiber optic fibers 38, FIG. 2, where like parts have been given like numbers, enclosed in undersea communication cable 14 as shown. In one example, repeaters 12, FIG. 1 may be utilized to amplify and restore attenuated light signals. Power may be delivered to repeaters 12 by high voltage, low current DC power supplies 24, 28 and power supplies 20 as discussed above with reference to FIG. 1, and is typically carried to repeaters 12 by a single communication cable power conductor, e.g., communication cable power conductor 40, FIG. 2, enclosed in undersea communication cable 14. In one example, repeaters 12 are electrically isolated from sea ground and are powered by the current flowing in communication cable power conductor 40 from one end of the undersea communication cable 14 to the other without regard to voltage to sea ground. There is often a need to create a branch from undersea communication cable 14 so communication between more than two points may be obtained without requiring completely separate cables. Powering repeaters 12 in a branch can be problematic since the main power conductor cannot be breached and the relative voltage to seawater at any particular point is unknown, variable or not defined. Moreover, it may be desirable to supply power to a nearby external load which may have an arbitrary and dynamically changing resistance or power such as undersea devices, equipment, and the like, not related to the typical main function of the undersea communication cable.

Figure 3:
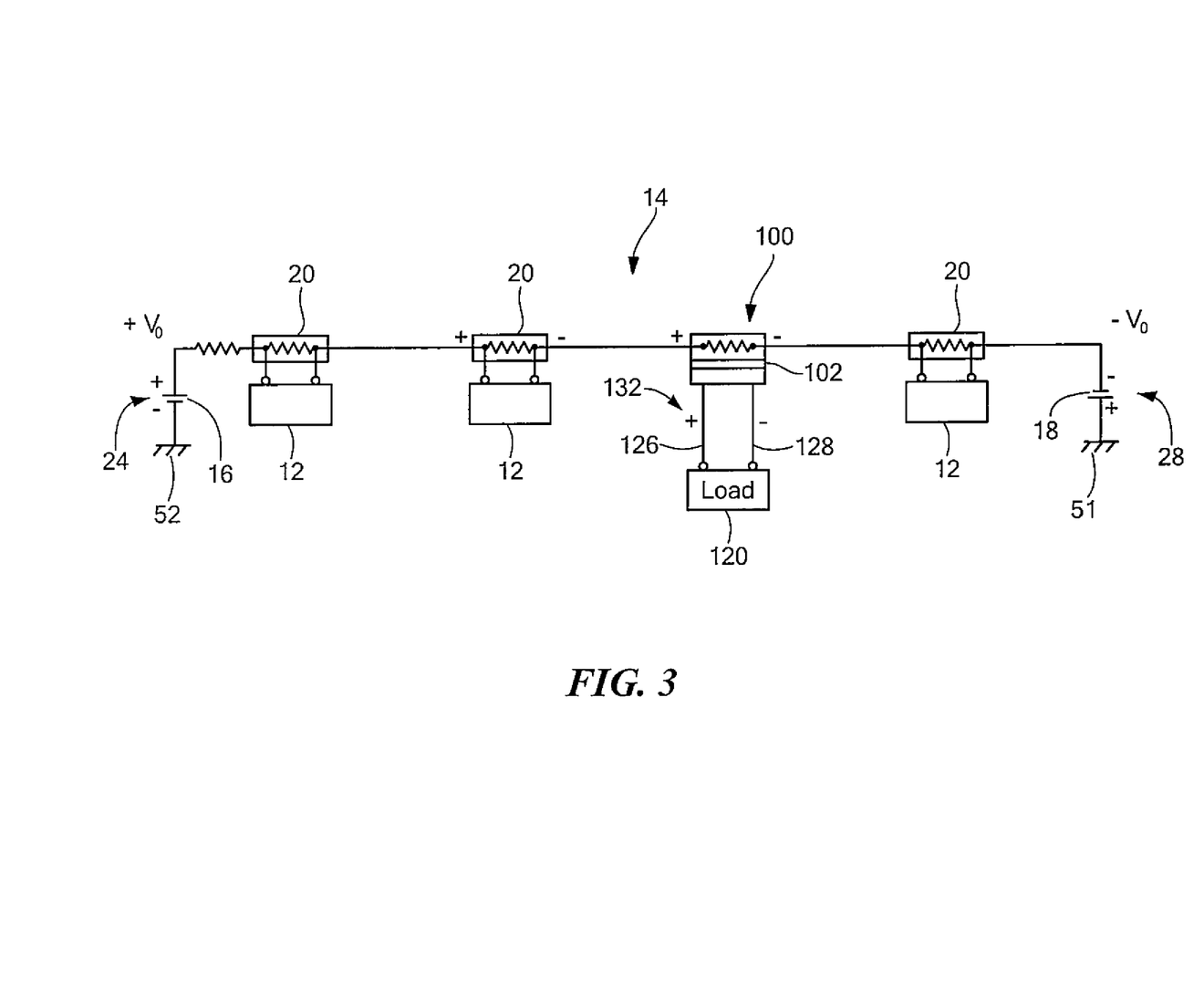
FIG. 3 is a schematic block diagram showing one embodiment of the isolated power supply system for an undersea communication cable of this invention used to create a branch off of an undersea communication cable.

There is shown in FIG. 3, where like parts have been given like numbers, one embodiment of the isolated power supply system 100 for an undersea communication cable, such as undersea communication cable 14. In this example, unlike conventional power supplies 20 which are not isolated from undersea communication cable 14, isolated power supply system 100 for an undersea communication cable is isolated from undersea communication cable 14 as indicated at 102, as discussed in detail below. Isolated power supply system 100 includes one or more power converters, e.g., power converter 114, FIG. 4, and/or power converter 116, each including input circuitry 118 in series with communication cable power conductor 40 of undersea communication cable 14, as shown, e.g. between positive input 122 and negative input 124. Isolated power supply system 100 also includes one or more outputs, e.g., output 126 and/or output 128, in this example, positive and negative, respectively, as shown, and each electrically isolated from communication cable power conductor 40, e.g., by isolation transformer 150 as shown, and preferably coupled to external load 120, FIGS. 3 and 4, such as undersea devices, equipment, and the like, located on branch 132 off of undersea communication cable 14. External load 120 typically has an arbitrary and dynamically changing load impedance.

Figure 4:
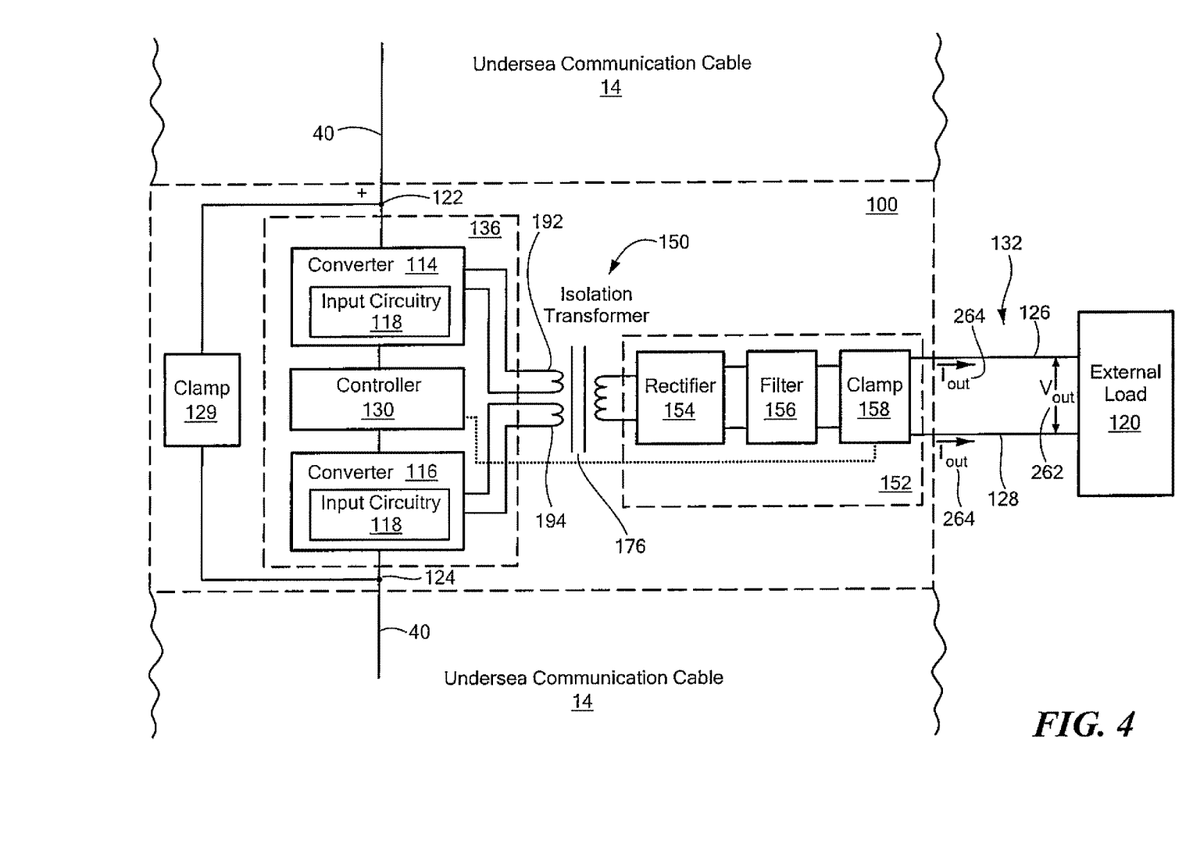
FIG. 4 is a schematic block diagram showing one example of the primary components of the isolated power supply system for an undersea communication cable shown in FIG. 3.

Isolated power supply system 100, FIG. 4, also includes controller 130 coupled to power converter 114 and/or power converter 116 as shown and is configured to control the operation of power converter 114 and/or power converter 116 such that power converter 114 and/or power converter 116 provides the one or more outputs 126 and/or 128. In one example, the one or more outputs 126 and/or 128 preferably include one or more of an output voltage, a programmable output voltage, a regulated DC output voltage, an output current, a programmable output current, and a regulated DC current. In one example the output voltage, $V_{OUT}$-262, may be a voltage in the range of about 0 to 2 kV or higher and the output current, $I_{OUT}$-264, may be a current in the range of about 0.1 A to about 5 A. Preferably the output voltage and output current are provided to external load 120 located on branch 132 off of undersea communication cable 14.

In one design, controller 130 may be a processor, such as a peripheral interface controller (PIC) microprocessor or similar type processor. In other designs, controller 130 may include or be configured as one or more processors, an application-specific integrated circuit (ASIC), firmware, hardware, and/or software (including firmware, resident software, micro-code, and the like) or a combination of both hardware and software that may all generally be referred to herein as a "controller", "module", "engine" or "system" which may be part of controller 130 and isolated power supply system 100. Computer program code for the programs for carrying out the instructions or operation of one or more embodiments of the isolated power supply system 100 for an undersea communication cable and controller 130 of this invention may be written in any combination of one or more programming languages, including an object oriented programming language, e.g., C++, Smalltalk, Java, and the like, or conventional procedural programming languages, such as the "C" programming language or similar programming languages or in assembly code.

Figure 5:
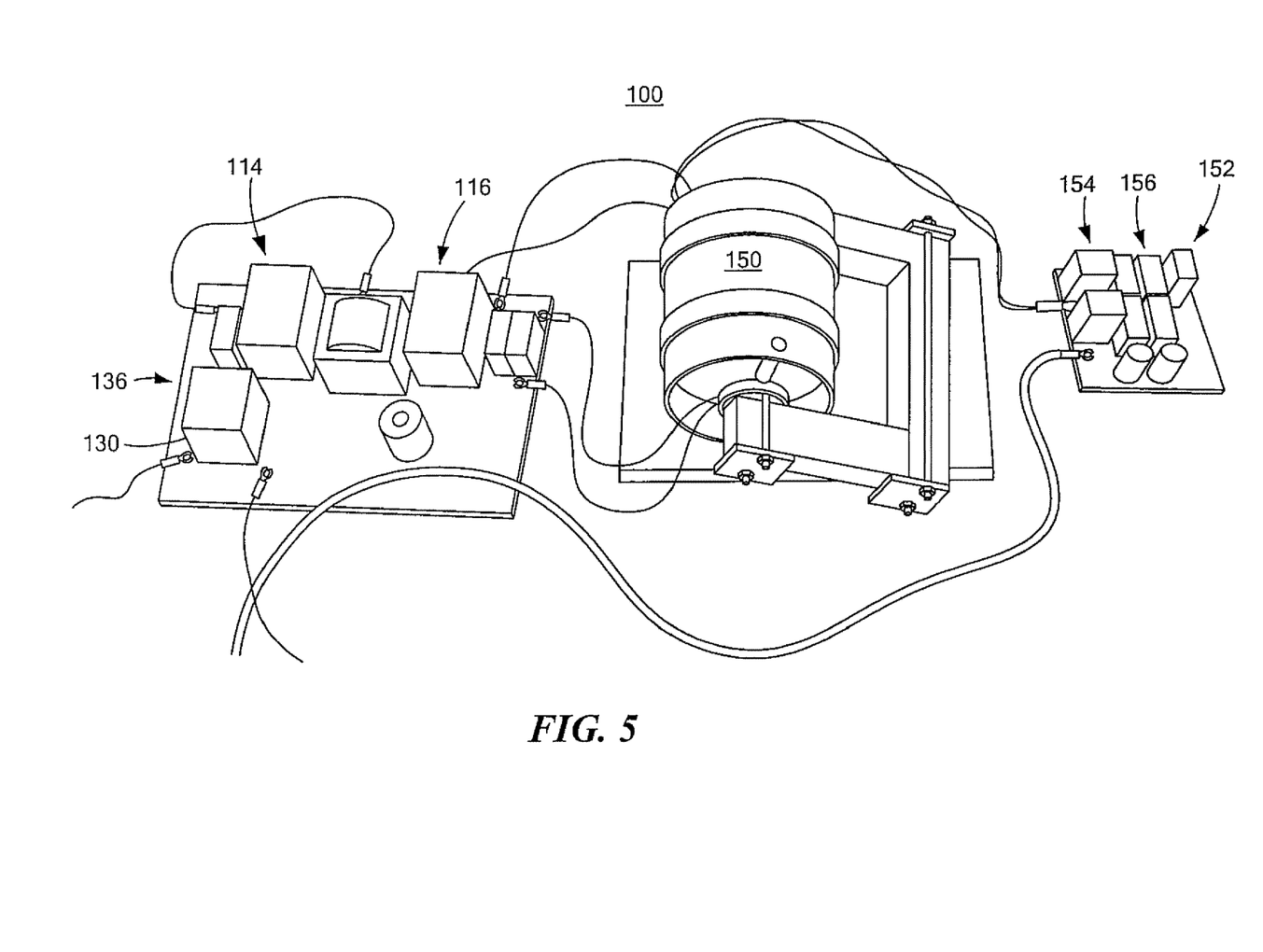
FIG. 5 shows a three-dimensional view of one example of a prototype of the isolated power supply system 100 for an undersea communication cable shown in FIGS. 2-4.

Preferably, the one or more outputs 126 and/or 128 are electrically isolated from communication cable power conductor 40, e.g., by isolation transformer 150. Isolated power supply system 100 also preferably includes main electronics board 136, e.g., a printed circuit board or similar type electronics board that includes at least power converter 114 and/or power converter 116 and controller 130 thereon and is coupled to transformer 150. Isolated power supply system 100 also preferably includes secondary electronics board 152, e.g., a printed circuit board or similar type electronics board, coupled to transformer 150 as shown. In one design, secondary electronics board 152 preferably includes rectifier 154, filter 156 and clamp 158. FIG. 5, where like parts have been given like numbers, shows a one example of a prototype of one embodiment of isolated power supply system 100 with power converter 114, power converter 116, and controller 130 shown mounted on main electronics board 136 and coupled to isolation transformer 150 and secondary electronics board 152 with rectifier 154 and filter 152 mounted to the printed circuit board as shown.

Power converter 114, FIGS. 3-5, and/or power converter 116 are each preferably configured to control current or voltage with input circuitry 118 to provide one or more outputs 126 and/or 128. In one example, input circuitry 118 of power converter 114 and/or power converter 116 provides a regulated DC voltage and then chops it into AC. The AC goes through isolation transformer 150 for isolation and is rectified by rectifier 154 and filtered by filter 156 to produce the desired regulated DC output, e.g., $V_{OUT}$-262 and/or $I_{OUT}$-264, FIG. 4, at the one or more outputs 126, 128. Clamp 158 preferably coupled to one or more output 126, 128 ensures that communication cable power conductor 40 is discharged for worker safety. Clamp circuit 129 coupled to input 122 preferably diverts surge current around power converter 114 and/or power converter 116 during a cable fault (discussed in further detail below). One common event may be a fishing boat snagging undersea communication cable 14 and damaging the insulation which may result in a power supply short to sea ground. The transient current from this event can be as large 750 A. Therefore, everything powered by undersea communication cable 14 needs to survive these transients so that repairs to the damaged section allow the cable to continue to operate.

Figure 6:
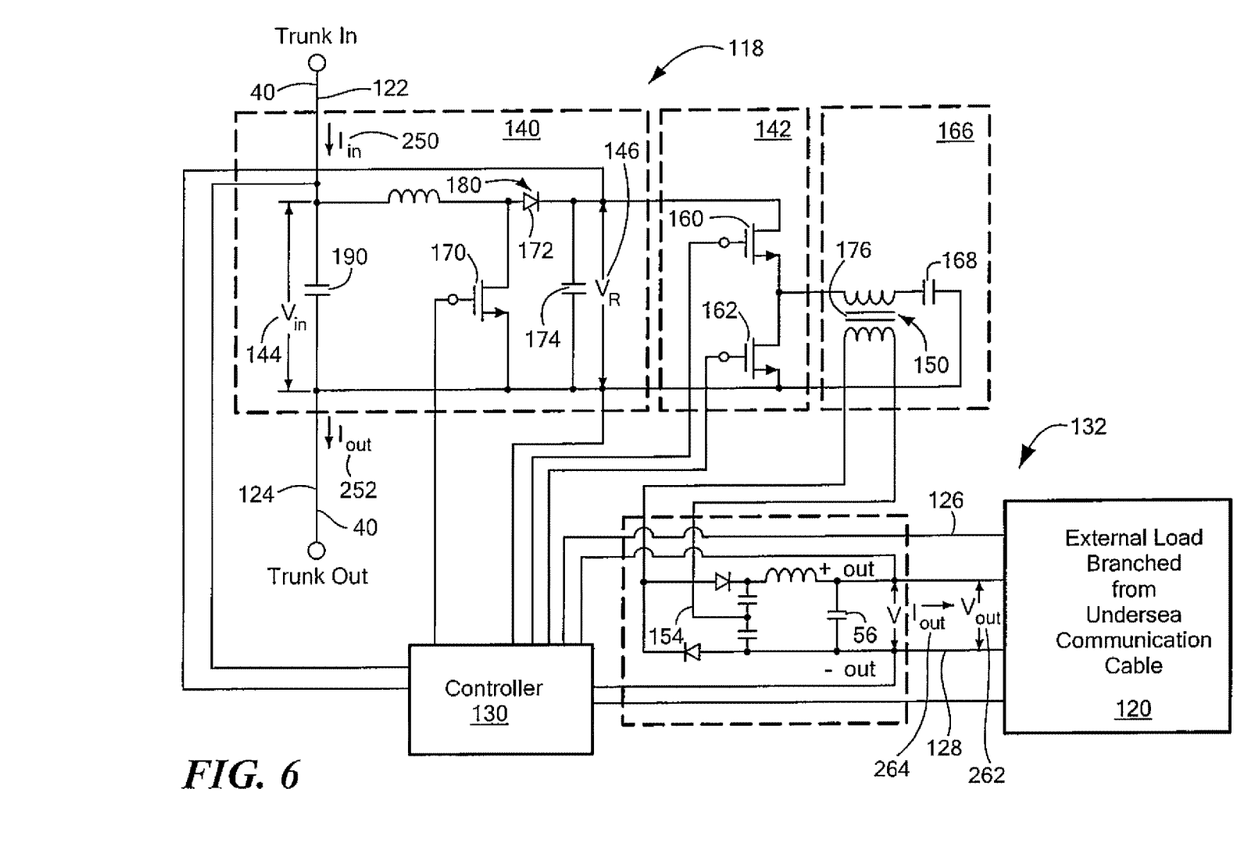
FIG. 6 is a circuit diagram showing in further detail one example of the input circuitry of the one or more power converters shown in FIGS. 4-5.

In one design, input circuitry 118 of each power converter 114 and/or power converter 116 preferably includes a plurality of sections, e.g., section 140, FIG. 6, where like parts have been given like numbers, and section 142, which are preferably configured to divide input voltage, $V_{IN}$-144, from communication cable power conductor 40 between sections 140, 142. In one design, section 140 may be configured as a modulated converter, e.g., a pulse width modulator or similar type modulator to provide regulated DC voltage $V_R$-146. In one example, modulated converter 140 preferably includes one or more controllable switches, e.g., controllable switch 170, such as a silicon carbide metal oxide field effect transistors MOSFETs or similar type controllable switch, coupled to controller 130 as shown such that modulated converter 140 provides regulated DC voltage $V_R$-146. In this example, modulated converter 140 also preferably includes diode 172 and capacitor 174.

In one example, section 142 may be a configured as an inverter or chopper responsive to the regulated voltage, $V_R$-146. In one example, inverter 142 may be a square wave inverter or similar type inverter and preferably includes one or more controllable switches, e.g., controllable switches 160 and 162 which may be a silicon carbide metal oxide field effect transistors (MOSFETs) or similar type controllable switches. Controllable switches 160, 162 are coupled to controller 130 as shown to drive transformer primary circuit 166 which preferably includes isolation transformer 150, core 176 and capacitor 168 configured such that controllable switches 160, 162 may open at low voltages, e.g., a voltage or bias voltage across controllable switches 160, 162. In one design, controller 130 may be coupled to modulated converter 140 and inverter 142 by magnetically isolated gate drives.

Transformer core 176, FIGS. 4 and 6, of isolation transformer 150 is preferably gapped to allow controllable switches 160, 162, FIG. 6, of inverter 142 to close at approximately zero voltage. The core gap, typically formed by inserting a spacer less than about 1 mm thickness between the two core sections, increases the transformer primary magnetizing current. This current forces the transformer voltage to the opposite rail when one of the half bridge drive transistors 160, 162 open. The voltage across the other transistor is forced to zero, greatly reducing the switching loss.

One or more outputs 126, 128 are preferably actively clamped by clamp 158, FIG. 4, to a small voltage when an input is not powered on. During handling and testing before installation, it is preferable to have the output voltage be held low. This allows testing of interconnections without the possibility of generating hazardous voltage during factory and shipboard testing.

In one example, controller 130, FIG. 6, coupled to controllable switches 170 of modulated converter 140 and controllable switches 160, 162 of inverter 142 is preferably configured to provide the DC voltage $V_R$-146.

Figure 7:
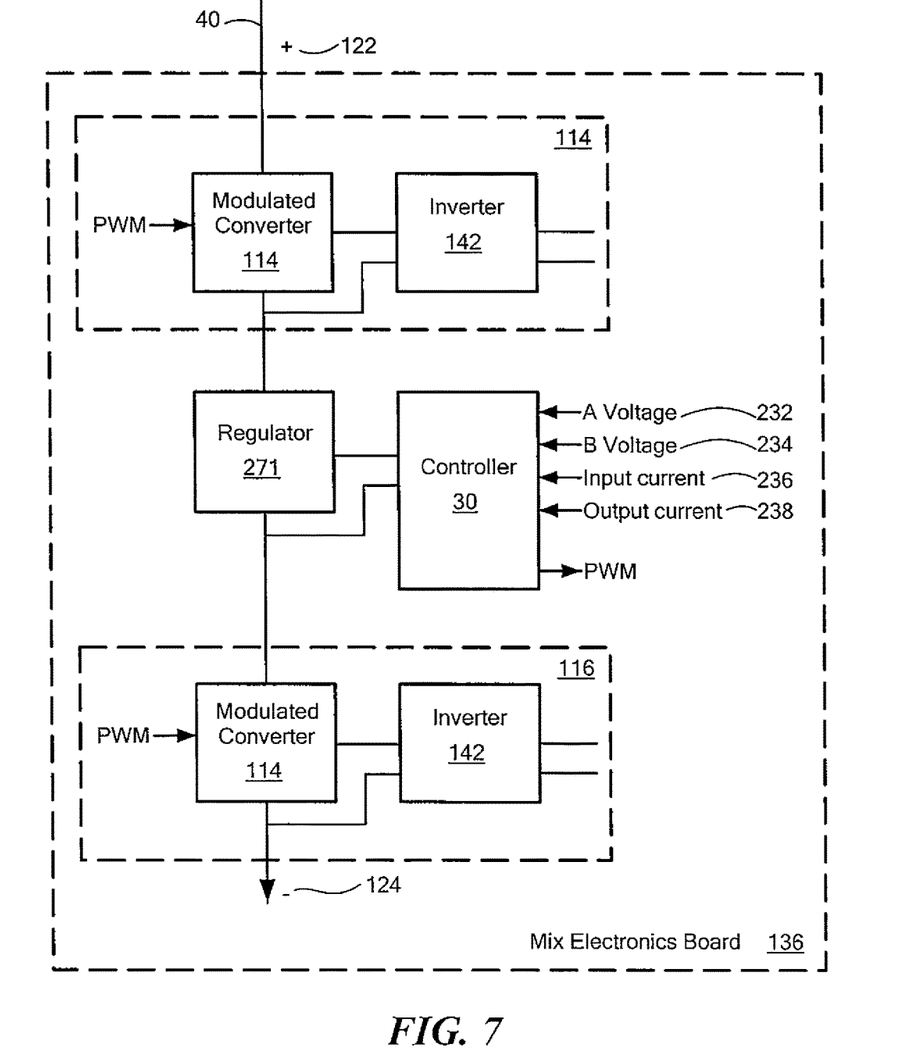
FIG. 7 is a schematic block diagram showing in further detail the primary components of isolated power supply system for an undersea communication cable shown in one or more of FIGS. 3-6.

FIG. 7, where like parts have been given like numbers, shows in further detail one embodiment of the various components of system 100. In this example, system 100 preferably includes two identical power converters 114, 116 each with input circuitry 118 and sections configured as modulated converter 140 and inverter 142, e.g., as discussed above with reference to FIG. 6, power supply or voltage regulator 271, FIG. 7, e.g., a 5 V power supply which are all preferably controlled by controller 130. Controller 130 is preferably responsive to the input voltage A-232 from power converter 114, e.g., $V_{IN}$-144, FIG. 6, input voltage B-234, FIG. 7, from power converter 116, e.g., $V_{IN}$-144, input current 234, e.g., $I_{IN}$-250, and output current 238, e.g., $I_{OUT}$-252. As discussed above, modulated converter 140 produces the output voltage, e.g., a regulated DC voltage or a programmable output voltage, $V_R$-146. Controller 130 may also be responsive to an arbitrary and dynamically changing external load impedance 220 located on 132 branch off the undersea communication cable 110, FIG. 1.

In operation, as power converter 114, FIGS. 4-7, and power converter 116 are powered by a current source, e.g., regulator 270, modulated converter 140, FIG. 6, preferably provides regulated DC voltage, VR-146, which is then fed to inverter 142. Each inverter 142, one for power converter 114, FIG. 4, and one of power converter 116 drives primary winding 192, 194 respectively on isolation transformer 150. Voltage sharing between power converter 114 and power converter 116 may be enforced by shared transformer core 176, FIGS. 4 and 6. Modulated converters 140, FIG. 6, of power converter 114 and power converter 116 are preferably wound on the same core 176 to ensure voltage sharing. Preferably, power converters 114, 116 are driven together from a single Pulse Width Modulation (PWM) output provided by controller 130 and controllable switches 160, 162, and 172. The duty factor of the PWM is preferably used to regulate each of power converters 114, 116. Input voltage, $V_{IN}$-144, is preferably shared between power converter 114 and power converter 116, which each may be 1200 V power converters which can be utilized up to 2400 V, but preferably clamped to about 1500 V. Preferably controller 130 and voltage regulator 271, FIG. 7, are located between power converters 114, 116 as shown. Such a design preferably minimizes the voltage isolation needed between the power converters 114, 116 and controller 130.

In one design, controller 30, FIG. 6, is preferably coupled to controllable switches 160, 162 and 170 and an arbitrary and dynamically changing external load impedance 130 located on branch 132 off of undersea communication cable 12, FIGS. 3 and 4, as shown. In this example, controller 130, FIG. 6, is preferably configured to measure input current, $I_{IN}$-250, of communication cable power conductor 40, the regulated DC output voltage, $V_R$-146, regulated DC output voltages 126, 128, $V_{OUT}$-262, the desired regulated DC current, $I_{OUT}$-264 and the external load resistance of external load 120. In this example, controller 130 is preferably configured to adjust the duty cycle of switching of the controllable switches 160 and 162 of inverter 142 and controllable switch 170 of modulated converter, such that the one or more outputs 126, 128 provide the desired regulated voltage, $V_{OUT}$-262, or the desired regulated DC current discussed above to external load 220.

Preferably, input circuitry 118 of power converter 114 and/or power converter 116 includes bypass capacitor 190 configured to localize power supply transients to minimize interference with other electronics.

Preferably, system 100, FIGS. 3-6, is housed in a pressure vessel which may be sealed and filled with oil, pressurized air, or nitrogen for electrical insulation and heat transfer.

Preferably, controllable switches 160, 162 and 170 may include Field Effect Transistors (FETs), silicon Metal Oxide Field Effect Transistors (MOSFETs), Insulated Gate Bipolar Transistors (IGBTs), field effect transistor controlled Thyristors (MCTs) Gate Run Off Thyristors (GTOs), and Power Darlingtons.

Figure 8:
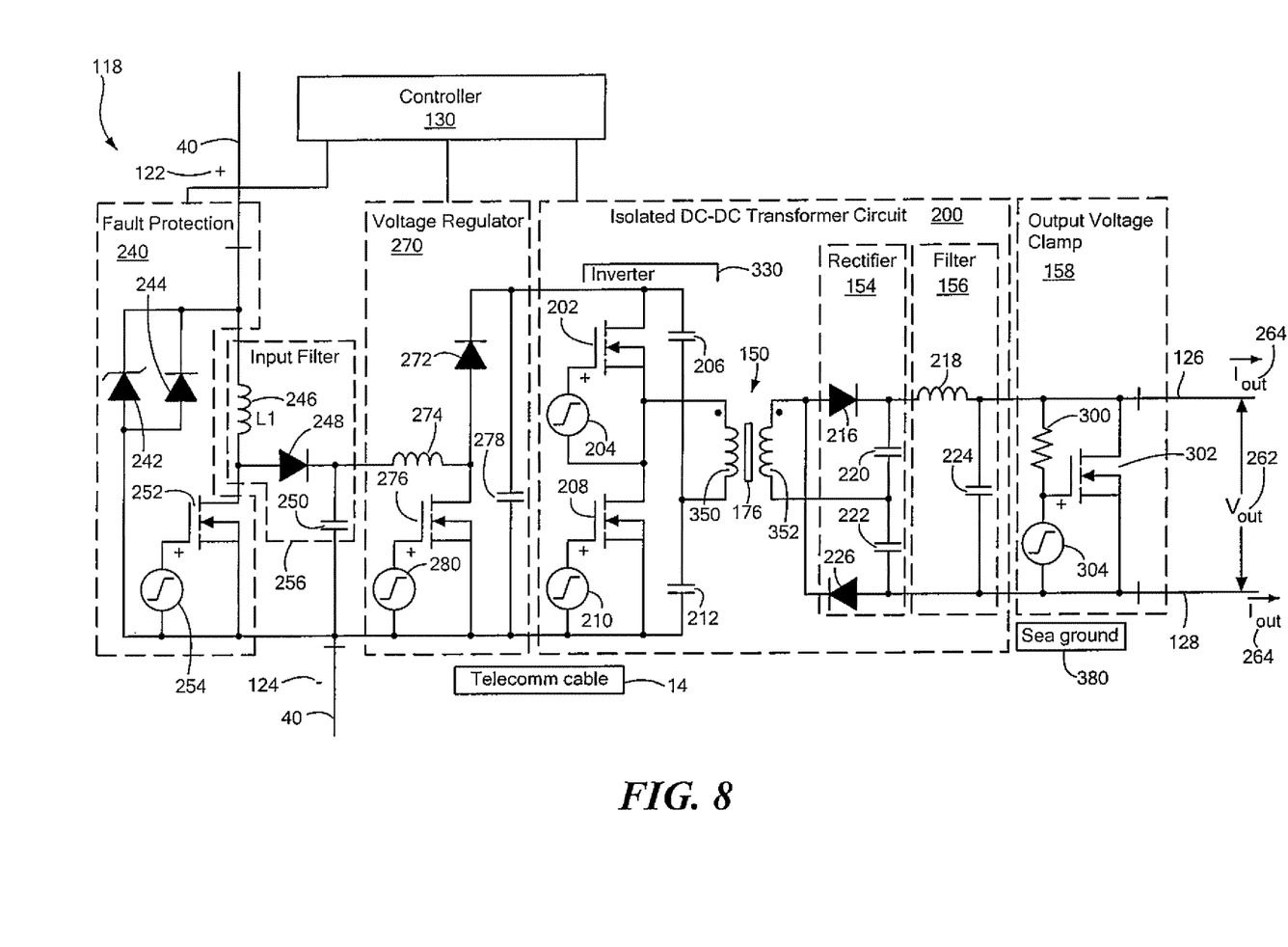
FIG. 8 is a circuit diagram showing primary components of another embodiment of the input circuitry of the one or more power converters shown in one or more of FIGS. 3-7.

In one embodiment, isolated power supply system 100 for an undersea communication cable may include power converter 114 and/or power converter 116 each with input circuitry 118, FIG. 8, where like parts have been given like numbers. In this example, input circuitry 118 preferably includes isolated variable DC-DC transformer circuit 200. In one design, isolated variable DC-DC transformer circuit 200 preferably includes switching device 202, isolated gate driver circuit 204, capacitor 206, switching device 208, isolated gate driver circuit 210, isolation transformer 150, capacitor 212, diode 216, inductor 218, capacitors 220, 222, and 224 and diode 226 coupled in the exemplarily configuration as shown. Switching devices 202 and 208 may be MOSFETs or similar type switching devices as discussed above. Isolated gate drive circuits 204 and 210 may be any of several commercially available isolated gate driver circuits (e.g., UCC 21520 available from Texas Instruments, Dallas Tex.) which can directly drive power transistors with acceptable delays and can stand off the DC voltages up to 1500 Volts for more than 25 years.

In one design, controller 130 preferably controls the operation of isolated DC-DC transformer circuit 200 to provide current limiting. Controller 130 may also control the operation of variable DC-DC transformer circuit to provide output current $I\_{OUT}$-264, e.g., a regulated DC current or a programmable output current. Controller 130 may also be configured to control the operation of variable DC-DC transformer circuit 200 to provide voltage limiting. Controller 130 may also control the operation of variable DC-DC transformer circuit 200 to provide output voltage, $V_{OUT}$-262, e.g., a regulated DC output voltage or a programmable output voltage.

In one design, controller 130 is configured to control the operation of isolated DC-DC transformer circuit 200 to provide power to branch 132, FIGS. 3 and 4, located off undersea communication cable 14 or provide power to load 130, of an arbitrary and dynamically changing impedance.

In one design, input circuitry 118, FIGS. 3-8, may include fault protection circuit 240, FIG. 8, coupled to communication cable power conductor 40 and isolated DC-DC transformer circuit 200 as shown configured to bypass fault current around input circuitry 118 of power converter 114 and/or power converter 116. Fault protection circuit 240 preferably includes Zener diode 242, diode 244, switching device 252, e.g., a MOSFET or similar type switching device, and optional isolated gate driver circuit 254. Cable fault current can be in either direction. When the fault current is reversed of normal polarity, diode 244 conducts the full current with a voltage drop until current reverses to the normal polarity. Diode 248 disconnects the power circuitry while the current is reversed. Although in this example, diode 244 is shown in parallel with Zener diode 242, this is for exemplary purposes only, as diode 244 may be placed directly across the chain of conductors. Zener diode 242 is preferably a voltage limiting device, e.g., a metal oxide varistor (MOV) or similar type device which initially carries the full cable fault current from communication cable power conductor 40 and limits the voltage to approximately twice the maximum nominal voltage, e.g., about 1,200 V to about 2,400 V, or higher or lower voltages as known by those skilled in the art. Zener diode 242 may not necessarily carry the fault current for the entire duration of a fault event and may not necessarily limit the voltage to a safe value.

In one example, input circuitry 118 preferably includes fault protection circuit 240 coupled to isolated DC-DC transformer circuit 200 and communication cable power conductor 40 configured to limit the input voltage to a maximum desired input voltage. In one design, input circuitry 118 may include input filter 256 preferably includes inductor 246, diode 248 and capacitor 250. Input filter 256 preferably limits the rate of rise of the voltage on switching device 252 so that all voltage remains at safe levels until controller 130 can turn on switching device 252. Switching device 252 may be several devices in parallel and is preferably rated to carry the full cable current for the duration of a fault event.

Preferably, fault protection circuit 240 continues to operate during the cable fault and turns switching device 252 off when the fault current has reduced to the normal operating current.

Isolated DC-DC transformer circuit 200 of input circuitry 118 preferably includes rectifier circuit 154 as discussed above with reference to FIG. 4 which in this example includes diode 216, FIG. 8, capacitors 220, 222, and diode 226. Isolated variable DC-DC transformer circuit 200 also preferably includes filter 156 as discussed above with reference to FIG. 4 which in this example preferably includes inductor 218 and capacitor 224.

Input circuitry 118 preferably include output voltage clamp 158 as discussed above with reference to FIG. 4. In this example, output voltage clamp 158, FIG. 8, preferably includes resistor 300, switching device 302, e.g., a MOSFET or similar type switching device, and isolated gate driver circuit 304. Preferably, output voltage clamp 158 is configured such that the maximum desired output voltage, $V_{OUT}$-262, is about 10 V when controller 130 is not energized.

In one example, isolated variable DC-DC transformer circuit 200 of input circuitry 118 may include current divider or voltage regulator 270, e.g., as discussed above with reference to FIG. 7, which is preferably coupled between communication cable power conductor 50 and isolated DC-DC transformer circuit 200, FIG. 8, as shown. In one design, current divider or voltage regulator 270 may be programmable and preferably includes one or more of inductor diode 272, inductor 274, switching device 276, e.g., a MOSFET or similar type device, capacitor 278 and isolated gate driver circuit 280. Voltage regulator 270 is preferably configured to direct a fraction of the input current from communication cable power conductor 40 to isolated DC-DC transformer circuit 200. In one design, the current divider or voltage regulator 270 is configured as a boost regulator as shown.

Preferably, power converter 114 and/or power converter 116, shown in one or more of FIGS. 4-8, each with input circuitry 118, are connected in series with communication cable power conductor 40.

In one exemplarily operation of isolated power supply system 100, FIGS. 3-8, for an undersea communication cable, a nominal 1 A current flows between positive input 122, FIG. 8, and negative input 124. Controller 130 controls the state of transistors 252, 276, 202, 208, and 302 using isolated gate driver circuits 254, 280, 204, 210, and 304, respectively. Both power circuits are identical and preferably have the same control signals. Controller 130 is preferably powered by voltage regulator 271 designed to tolerate the cable fault current. At start-up, either isolated gate driver circuit 254 or isolated gate driver circuit 280 includes circuitry to turn on its associated switching device (switching device 252, switching device 276, respectively) in the absence of gate power. This allows cable current to flow through voltage regulator 270 at start-up. The normal idle state of switching device 276 is continuously on providing a minimum voltage drop to communication cable power conductor 40.

Once the controller 130 is active, controller 130 turns switching device 276 on for minimum idle voltage drop and power consumption. When controller 130 receives a request for output voltage or current to be provided at outputs 126, 128, controller 130 turns switching device 252 off and switching device 302 off and begins PWM of switching device 276 and operates switching devices 202 and 208 as a square wave inverter 330 driving primary 350 of isolation transformer 150. The PWM action of switching device 276 sends cable current to capacitor 278 for some fraction of the time. This fraction of time is preferably variable and allows the output current at outputs 126, 128 to be any desired fraction of the line current of communication cable power conductor 40 from zero to about 1 A. Inductor 274 preferably controls the rate of change of current into switching device 276 and diode 272. Although in this example, voltage regulator 270 as discussed above is the same as a classic boost converter, in this example, voltage regulator 270 functions to steer a fraction of the current from communication cable power conductor 40 into capacitor 278. The duty factor of switching device 276 changes slowly to avoid transient problems. If the load current suddenly drops, the switch 252 needs turn on quickly to avoid an overvoltage condition. The maximum voltage on capacitor 278 is determined by the voltage rating of the switching devices. The voltage on capacitor 278 times the cable current is the input power for each power circuit.

Preferably the voltage across capacitor 278 is converted to AC by the switching devices 202 and 208 functioning as a chopper which excites primary winding 350 of isolation transformer 150. Capacitors 206 and 212 preferably resonate with the leakage inductance of isolation transformer 150 so that switching devices 202 and 208 turn off at nearly zero current. The magnetizing inductance of isolation transformer 150 may be controlled by a core gap so that the magnetizing current can charge and discharge the output capacitance of switching device 202 and 208. This allows switching devices 202 and 208 to turn on at zero voltage. Switching at zero voltage and zero current is a well-known technique to minimize switching losses.

Preferably isolation transformer 150 isolates the primary circuit, e.g., fault protection circuit 140, voltage regulator 270 and inverter 330 of isolated variable DC-DC transformer circuit 200, which is at the voltage of communication cable power conductor 40, e.g., as high as about 15 kV, from sea ground 380. The secondary circuit including part of isolated variable DC-DC transformer circuit 200 as shown coupled to secondary winding 352 of isolation transformer 150, rectifier 154, filter 156, and output voltage clamp 158 as discussed above is referenced to sea ground 380 and insulated from the components connected to the communication cable power conductor 40. In one design, diodes 216, 226, and capacitors 220, 222 form a full wave voltage doubler.

The DC output voltage provided at outputs 126, 128 may be approximately the voltage on capacitor 278 times the turns ratio of isolation transformer 150. Preferably inductor 218 and capacitor 224 form filter 156, as discussed above, e.g., an output ripple filter. The transformer ratio of isolation transformer 150 is preferably selected to determine the maximum output voltage and current provided at outputs 126, 128. Isolated gate driver circuit 304 is preferably designed so that switching device 302 of output voltage clamp 158 is turned on unless controller 130 actively turns it off. This is preferably used for safety during installation and testing of system 100.

Typically, system 100 utilizes two power stages, one connected to positive input 122 of the control section and one connected to negative 124, e.g., as shown in FIG. 4. Preferably, the current from communication cable power conductor 40 flows through the series connected power converter 114 and/or power converter 116 and control 130 as shown. In this example, inductor 274 is preferably wound with two separate coils and isolation transformer 150 has two separate primary windings, e.g., primary windings 192, 194.

Preferably, isolated gate driver circuit 254 turns on switching device 252 when the input voltage exceeds a threshold or increases too rapidly and may also be held on by controller 130. This allows rapid activation and controlled release of fault protection circuit 240. Isolated gate driver circuit 280, 204, and 210 may any of several commercially available isolated gate driver circuits (e.g., UCC 21520 available from Texas Instruments, Dallas Tex.) which can directly drive power transistors with acceptable delays and can stand off the DC voltages up to 1500 Volts for more than 25 years. Isolated gate driver circuit 304 is preferably the only isolated gate driver circuit which needs to withstand the voltage on communication cable power conductor 40 to sea ground 380. Preferably, isolated gate driver circuit 304 is a fiber optic coupled phototransistor which keeps clamp switching device 302 turned off under control of the controller 130. Communication between the controller 130 and the shore may be via a local fiber optic signal link from the repeater electronics housed in the same pressure vessel. The output section discussed above preferably delivers output voltage and current feedback information to controller 130 by an optical fiber or transformer isolated link.

Although the configuration of inductor 246, capacitor 250, switching device 252, and diode 248 of fault protection circuit 240 have the same configuration as inductor 274, capacitor 278, switching device 276 and diode 272 of voltage regulator 270 these circuits never operate at the same time. Switching device 252 is preferably a high current device capable of carrying cable fault transients of up to 750 A. Switching device 276 is preferably a low current device optimized for switching efficiency at the normal cable current of approximately 1 A. Similarly, diode 248 and diode 244 are preferably high current diodes and diodes 272, 216, and 226 are low current, low switching loss diodes.

Figure 9:
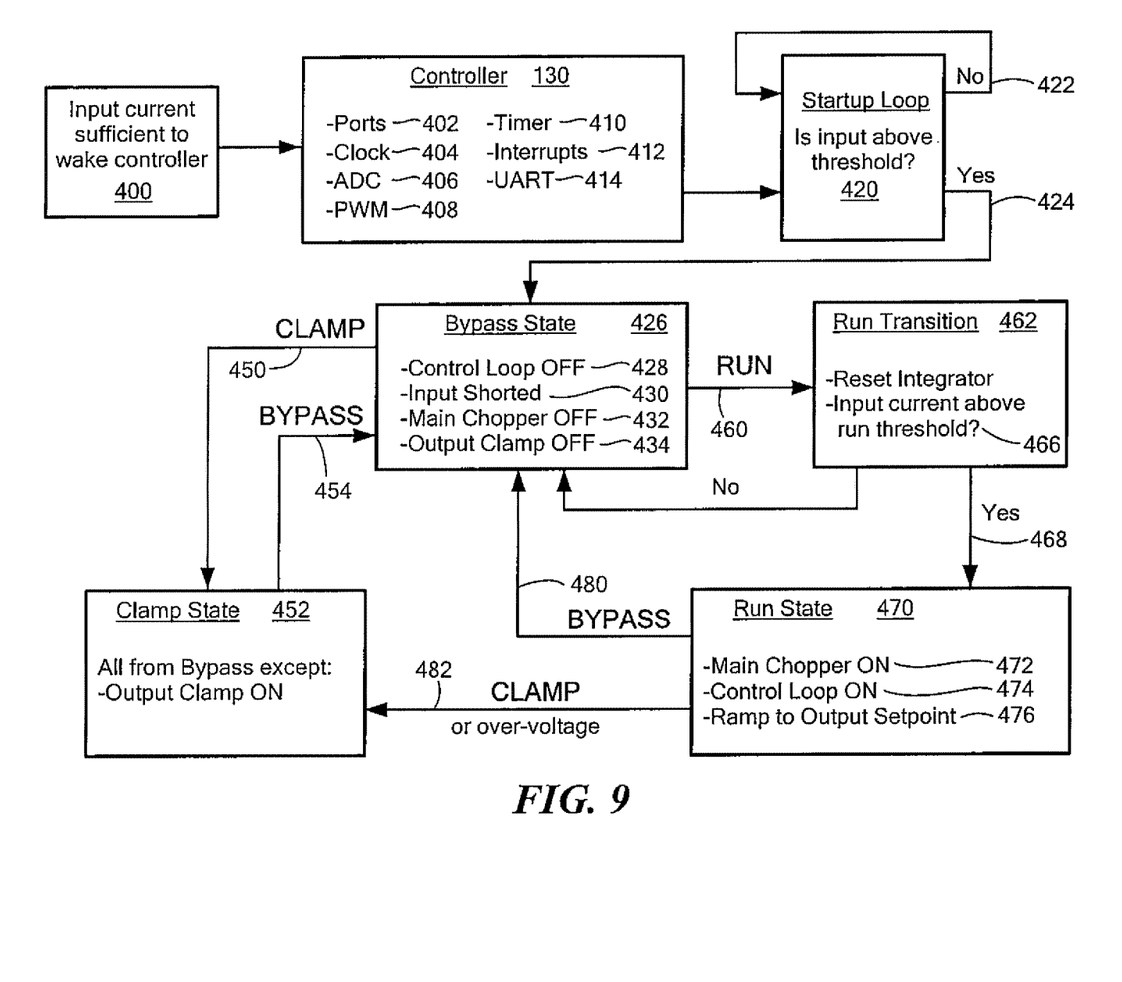
FIG. 9 is a flowchart depicting one example of the primary steps of the isolated power supply method shown in one or more of FIGS. 3-7.

FIG. 9 shows one exemplary flowchart of the operation of controller 130 of isolated power supply system 100 and the method thereof. In this example, sufficient cable current from communication cable power conductor 40, FIG. 7, powers voltage regulator 271 which wakes controller 130 and voltage regulator 271 provides voltage to controller 130, step 400, FIG. 9. One exemplarily configuration of controller 130 includes one or more of ports 402, clock 404, analog-to-digital conversion (ADC) 406, PWM 408, timer 410, interrupts 412, and Universal Asynchronous Receiver/Transmitter (UART) 414. A determination is made whether or not the input current is above the threshold, step 420. If no, indicated at 422, step 420 is repeated. If yes, indicated at 424, bypass state 426 is initiated. Bypass state preferably includes turning off a control loop, indicated at 428, determining if the input is shorted, indicated at 430, determining if whether or not inverter 330, FIG. 9, functioning as a chopper is off, indicated at 432, and determining whether or not output voltage clamp 158, FIG. 8, is off, indicated at 434, FIG. 9. If a clamp is needed, step 450, then a clamp state 452 is provided and bypass command 454 is provided. If bypass state 426 is not required, then run transition 462 is initiated. Run transition 462 preferably resets the integrator, indicated at 464. The integrator is preferably part of the PID control loop and may be implemented using software on controller 130 and determines whether or not the input current can run above the threshold, indicated 466. If yes, indicated at 468, a run state 470 is provided and the main chopper or inverter 330, FIG. 8, is turned on, indicated at 472, the control loop is turned on indicated at 474, and a ramp to the output set point is achieved, indicated at 476. Once in the run state, a determination is made whether or not bypass state 426 is needed, indicated at 480, or if clamp state 452 is needed, indicated at 482. Steps 450, 454, 460, 480, and 482 are preferably commands received by controller 130 over serial.

Figure 10:
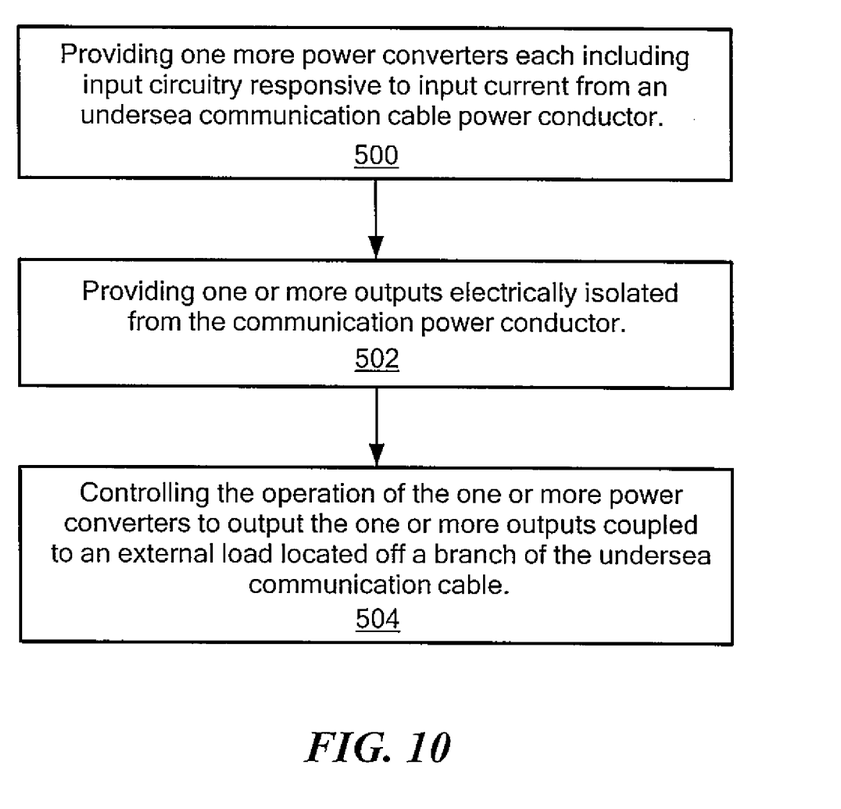
FIG. 10 is a flowchart depicting another example of the primary steps of the isolated power supply method shown in one or more of FIGS. 3-8.

In one example, the method for providing isolated power from a current carrying undersea communication cable to a branch located off the undersea communication cable includes providing one or more power converters each including input circuitry responsive to input current from an undersea communication cable power conductor, step 500, FIG. 10, providing one or more outputs electrically isolated from the communication power conductor, step 502, and controlling the operation of the one or more power converters to output the one or more outputs coupled to an external load located off a branch of the undersea communication cable, step 504.

For enablement purposes only, the following code portion is provided which can be executed by controller 130 to carry out the primary steps and/or functions of the controller 130 discussed above with reference to one or more of FIGS. 3-8 and recited in the claims hereof. Other equivalent algorithms and code can be designed by a software engineer and/or programmer skilled in the art using the information provided herein.

pseudocode for power supply
on processor power up reset:
set bypass mode (disables converter)
wait for line current to reach threshold
wait for command
Complete Command list:
GET_VIN_SET='a',
GET_IOUT_SET='b',
GET_VOUT_SET='c',
GET_OUTPUT_INT='e',
SET_IOUT='f',
SET_VOUT='g',
SET_VIN='h',
SET_VIN_KP='i',
SET_VIN_KI='j',
SET_VOUT_KP='k',
SET_VOUT_KI='l',
SET_IOUT_KP='m',
SET_IOUT_KI='n',
GET_VIN_KP='o',
GET_VIN_KI='p',
GET_VOUT_KP='q',
GET_VOUT_KI='r',
GET_IOUT_KP='s',
GET_IOUT_KI='t',
SET_BYPASS_MODE='u',
SET_OUTPUT_CLAMP='v',
CLEAR_OUTPUT_CLAMP='w',
SET_RUN_MODE='x',
GET_MODE='y',
GET_VIN='z',
GET_IIN='A',
GET_VOUT='B',
GET_IOUT='C',
SET_V_RAMP='D',
SET_I_RAMP='E',
GET_V_RAMP='F',
GET_I_RAMP='G'

"a-z" and "A-G" are exemplary implementations of a test communication protocol where each command is preferably matched to a character sent over serial to controller 130. For example, to set the input voltage, the character "h" is sent to controller 130 followed by the requested value, or to query $V_{OUT}$, the value "B" would be sent to controller 130 and controller 130 would respond with a value.

Major commands:
report output voltage and current
report internal voltages, currents, temperature
ramp output voltage at rate to final voltage
ramp output current at rate to final current
enter bypass mode (disable converter)
When active:
read voltage and current
update PWM (Pulse Width Modulator) duty factor as needed to minimize difference between output voltage or current and commanded value
If output voltage is greater than limit, enter shutdown mode, send status
decode and execute input commands as received
If input current drops below threshold, enter shutdown mode
repeat loop
Interrupts:
command byte received
Byte transmitted
ramp timer
ADC conversion complete Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. An isolated power supply system for an undersea communication cable comprising:
one or more power converters each including input circuitry including a modulated converter including one or more controllable switches followed by an inverter including one or more controllable switches responsive to an input current from a communication cable power conductor and in series with the communication cable power conductor of the undersea communication cable;
one or more outputs electrically isolated from the communication cable power conductor; and
a controller coupled to each of the one or more power converters, the controller configured to control the operation of the one or more power converters to provide the one or more outputs coupled to an external load located on a branch off of the undersea communication cable, the controller coupled to the one or more controllable switches of the inverter, an arbitrary and dynamically changing external load impedance located on the branch of the undersea communication cable, the controller configured to measure the input current communication cable power conductor, a regulated DC voltage output by the modulated converter, a desired regulated DC output voltage, a desired regulated DC current, and an external load impedance and configured to determine and adjust the duty cycle of switching of the controllable switches of the modulated converter and the inverter such that the desired regulated DC output voltage and/or the desired regulated DC current is provided to the external load impedance.

2. The system of claim 1 in which the one or more outputs includes one or more of: an output voltage, a programmable output voltage, a regulated DC output voltage, an output current, a programmable output current, and a desired regulated DC current.

3. The system of claim 2 in which the input circuitry and each of the one or more power converters includes an isolated variable DC-DC transformer circuit.

4. The system of claim 3 in which the controller is configured to control the operation of the variable DC-DC transformer circuit to provide current limiting.

5. The system of claim 3 in which the controller is configured to control the operation of the variable DC-DC transformer circuit to provide the output current.

6. The system of claim 3 in which the controller is configured to control the operation of the variable DC-DC transformer circuit to provide voltage limiting.

7. The system of claim 6 in which the controller is configured to control the operation of the variable DC-DC transformer circuit to provide the output voltage.

8. The system of claim 3 in which the isolated DC-DC transformer circuit includes a programmable voltage regulator.

9. The system of claim 3 in which the controller is configured to control the operation of the isolated DC-DC transformer circuit to provide power to the branch off the undersea communication cable.

10. The system of claim 3 in which the controller is configured to control the operation of the isolated DC-DC transformer circuit to provide power to a load off the undersea communication cable.

11. The system of claim 3 further including an output voltage clamp coupled to the isolated DC-DC transformer circuit and the communication cable power conductor configured to limit the output voltage to a maximum desired output voltage.

12. The system of claim 3 in which the output voltage clamp includes a controllable switch and a diode.

13. The system of claim 12 in which the maximum desired output voltage is about 10 V when the controller is not energized.

14. The system of claim 3 in which the input circuitry includes a current divider coupled between the communication cable power conductor and the isolated DC-DC transformer circuit configured to direct a fraction of the input current to the isolated DC-DC transformer circuit.

15. The system of claim 3 in which the current divider is configured as a boost regulator including one or more of a diode, an inductor, a controllable switch, and an isolated gate driver circuit.

16. The system of claim 3 in which the controller is configured to control the input circuitry and the one or more outputs by pulse width modulation.

17. The system of claim 3 in which the controller is configured to provide a large DC ripple current for toning.

18. The system of claim 1 in which the input circuitry of each of the one or more power converters includes a plurality of sections configured to divide the input voltage from the communication cable power conductor between the sections.

19. The system of claim 1 in which the controller is coupled to the input circuitry of each of the one or more power converters by magnetic isolation.

20. The system of claim 1 in which the controller is configured to control the operation of the input circuitry of each of the one or more power converters by pulse width modulation.

21. The system of claim 1 in which the one or more outputs are electrically isolated from the communication cable power conductor by an isolation transformer.

22. The system of claim 1 in which the input circuitry of each of the one or more power converters includes a bypass capacitor.

23. The system of claim 1 in which the switching of the controllable switches by the controller includes pulse width modulation.

24. The system of claim 1 further including a voltage regulator coupled to the one or more power converters and the controller configured to provide power to the one or more power converters and the controller.

25. The system of claim 1 in which the one or more power converters includes a plurality of power converters.

26. The system of claim 1 in which the branching unit is housed in a pressure vessel.

27. The system of claim 1 further including a fault protection circuit coupled to the communication cable power conductor and the isolated DC-DC transformer circuit configured to bypass fault current around the input circuitry of one or more power converters.

28. The system of claim 1 in which the inverter is configured to drive transformer primary circuit including an isolation transformer, the transformer core, and a capacitor to allow switches of the inverter to open at low currents.

29. The system of claim 28 in which the inverter includes a square wave inverter.

30. The system of claim 28 in which the transformer core is gapped to allow switches of the inverter to close at zero voltage.

31. The system of claim 1 in which the controllable switches of the modulated converter and the inverter includes one or more of: field effect transistors, silicon carbide metal oxide, field effect transistors (MOSFETs), insulated gate bi-polar transistors (IGBTs), field effect transistor controlled Thyristors (MCTs), gate runoff Thyristors (GTO), and power Darlingtons.

32. A method for providing isolated power from a current carrying undersea communication cable to a branch located off the undersea communication cable, the method comprising:
providing one or more power converters each including input circuitry responsive to input current from an undersea communication cable power conductor;
providing one or more outputs electrically isolated from the communication power conductor; and
controlling the operation of the one or more power converters to output the one or more outputs coupled to an external load located off a branch of the undersea communication cable by measuring an input current communication cable power conductor a regulated DC voltage output by a modulated converter, a desired regulated DC output voltage, a desired regulated DC current, and an external load impedance and determining and adjusting the duty cycle of switching of controllable switches of a modulated converter and an inverter such that the desired regulated DC output voltage and/or the desired regulated DC current is provided to the external load impedance.

33. The method of claim 32 in which the controlling including controlling the operation of the variable DC-DC transformer circuit to provide current limiting.

34. The method of claim 32 in which the controlling includes controlling the operation of the variable DC-DC transformer circuit to provide the output current.

35. The method of claim 32 in which the controlling includes controlling the operation of the variable DC-DC transformer circuit to provide voltage limiting.

36. The method of claim 32 in which the controlling includes controlling the operation of the variable DC-DC transformer circuit to provide the output voltage.

37. The method of claim 32 in which the controlling includes controlling the operation of the isolated DC-DC transformer circuit to provide power to the branch off the undersea communication cable.

38. The method of claim 32 in which the controlling includes controlling the operation of the isolated DC-DC transformer circuit to provide power to a load off the undersea communication cable.

39. The method of claim 32 further including providing a fault protection circuit coupled to the communication cable power conductor and the isolated DC-DC transformer circuit configured to bypass fault current around the input circuitry of one or more power converters.

40. The method of claim 32 further including providing an output voltage clamp coupled to the isolated DC-DC transformer circuit and the communication cable power conductor configured to limit the output voltage to a maximum desired output voltage.

41. The method of claim 32 in which the input circuitry includes a current divider coupled between the communication cable power conductor and the isolated DC-DC transformer circuit configured to direct a fraction of the input current to the isolated DC-DC transformer circuit.

42. The method of claim 32 in which the controlling includes controlling the input circuitry and the one or more outputs by pulse width modulation.

* * * * *